Patented Mar. 28, 1944

2,345,041

UNITED STATES PATENT OFFICE 2,345,041

ESTERS OF SULPHOTRICARBALLYLIC ACIDS

Walter P. Ericks, Cos Cob, and Edmund R. Meincke, Stamford, Conn., assignors to American Cyanamid Company, New York, N. Y., a corporation of Maine No Drawing. Application May 8, 1940, Serial No. 333,934

1 Claim. (Cl. 260—481)

This invention relates to methods for the production of esters of sulphotricarballylic acid. Our invention includes methods which are especially adapted for the preparation of mono- and diesters in pure form. We have found that the mono-esters of aconitic acid can be prepared in a pure form by reacting equimolecular quantities of aconitic anhydride, $HOOC.C_3H_3.(CO)_2:O$ or the anhydrides of the corresponding substituted aconitic acids with equimolecular quantities of a monohydric alcohol or with partially esterified dihydric or polyhydric alcohols containing at least one free hydroxyl group. Similar mono-esters can also be formed by reacting two moles of the anhydride with one mole of ethylene glycol or other dihydric alcohols, or by reacting three moles of the anhydride with glycerine or other trihydric alcohol. The reaction takes place quite readily when the anhydride and the alcohol or ester are heated together at 100–150° C.; preferably in the presence of a small amount of an esterification catalyst such as sulphuric acid.

This reaction permits us to make a large number of new derivatives of aconitic acid which are not only very interesting in themselves, but which can be readily transformed into the corresponding esters of sulphotricarballylic acid by reacting with aqueous solutions of sodium sulphite or sodium bisulphite. Thus, for example, when one mole of aconitic anhydride is heated with one mole of ethylene glycol monostearate or mono-oleate a mixed acid ester is formed which after neutralization with sodium hydroxide and sulphonation with sodium bisulphite forms an excellent detergent. An even cheaper product can be prepared by heating castor oil, which contains free hydroxyl groups, with aconitic anhydride followed by neutralization with alkali and sulphonation, and is suitable for use in solution in xylene or toluene for the resolution of crude oil field emulsions of the water-in-oil type. Another class of products useful for the same purpose, and also as detergents, can be obtained by heating mono- or diglycerides of vegetable oils such as the mono- or diglycerides of castor oil, coconut oil, linseed oil, soya bean oil, tung oil, olive oil, cottonseed oil, palm oil, teaseed oil, corn oil and the like with equimolecular quantities of aconitic anhydride at 100–160° C. until the mono-ester is formed and then neutralizing with aqueous sodium hydroxide solution and heating with a water solution of sodium bisulphite until sulphonation is complete. Other esters of this type can also be formed by reacting the anhydrides with sugars containing free hydroxyl groups such as dextrose, fructose, sucrose, maltose, their oxidation products such as glucosan, and their hydrogenation products such as sorbitol, mannitol and the like.

An additional important feature of the invention resides in the formation of di-esters of aconitic acids, both unsubstituted and substituted, and their transformation into the corresponding esters of sulphotricarballylic acid by sulphonation. We have found that any mono-ester of aconitic acid, including all those described above, or any corresponding monoester of a sulphotricarballylic acid may be transformed into the corresponding anhydride by first treating with dilute hydrochloric or other mineral acid if necessary to liberate the free carboxylic acid groups and then heating the acid ester to remove one mole of water. The dehydration is preferably carried out by heating the ester with toluene, xylene, or other non-reactive liquid which will aid in the water evolution. The anhydride of the acid ester is then reacted with an equimolecular quantity of an alcohol, or of a compound having at least one free alcoholic group, such as any of those mentioned above, by heating at 100–160° C. until the di-ester is formed. Where the monoester of a sulphotricarballylic acid is used no further treatment is necessary except possibly the neutralization of the third carboxylic acid group with a base; but where the starting material was a mono-ester of an aconitic acid the resulting diester may then be sulphonated, after neutralizing with alkali if necessary, by heating with an aqueous solution of sodium sulphite or sodium bisulphite.

The invention will be described in greater detail with reference to the following examples. It should be understood, however, that these examples are given for illustrative purposes only and that the invention in its broader aspects is not to be limited thereto but only by the scope of the appended claims.

Example 1

(a) 300 parts by weight of aconitic acid, 1000 parts of xylene and 3 parts of p-toluene sulphonic acid were heated to boiling in a jacketed still provided with an agitator and a water trap. The mixture was distilled with continuous agitation for about 7 hours, during which time the water evolved was separated from the distillate and the xylene returned to the still. A total of 31 parts of water was separated in this manner.

After the water evolution was completed the contents of the still were cooled and filtered and the crude anhydride remaining on the filter was purified by recrystallization from a 5:1 benzene-dioxane mixture. The purified aconitic anhydride was found to have a melting point of 77–78° C. 0.2011 gram required 36.6 cc. of tenth normal NaOH for titration to neutrality, this being a neutral equivalent of 52.1 as compared with the theoretical figure of 52.0.

(b) 47 grams (0.3 gram mole) of the aconitic anhydride and 55 grams (0.3 gram mole) of lauryl alcohol were heated at 100° C. for about 1 hour, when a sample of the product was completely soluble in dilute sodium hydroxide solution. 240 grams of 10% NaOH solution and 31 grams of sodium bisulphite were then added and the mixture was heated on a steam bath for 16 hours, after which the sulphonation was complete. The solution was then evaporated to dryness and purified by dissolving in 55 cc. of benzene, filtering, and precipitating by the addition of 100 cc. of cold alcohol. 54 grams of a yellow powder were obtained, which amounted to a 37% yield of the trisodium monolauryl sulphotricarballylate. It was soluble in water to a 20–25% cloudy solution which possessed excellent foaming properties.

*Example 2*

47 grams of the aconitic anhydride of Example 1 and 81 grams of stearyl alcohol were reacted by heating for 1 hour at 140° C., cooled to 60° C. and neutralized by the addition of 25.8 grams of NaOH in 100 cc. of water. 36 grams of NaHSO3 were then added and the mixture was heated with agitation for 16 hours, after which time the sulphonation was complete. The product was then dried and purified as in the preceding example.

121 grams of monostearyl trisodium sulphotricarballylate were obtained as a soft, light yellow solid which formed a clear 0.5% solution and cloudy 1 to 10% solutions in water.

*Example 3*

47 grams (0.3 gram mole) of the aconitic anhydride of Example 1 and 39 grams (0.3 gram mole) of octyl alcohol (2 ethyl hexanol-1) were heated together at 100° C. for 1 hour to form the monoester. 100 cc. of xylene and 0.25 gram of p-toluene sulphonic acid were then added and the mixture was heated to boiling as in Example 1(a) for 4½ hours. By this treatment 4.4 cc. of water (0.3 gram moles) were removed and an anhydride was formed from the two unesterified carboxylic acid groups of the monooctyl aconitate.

After the water removal was completed a second 39 grams of octyl alcohol was added and the mixture was heated for 1 hour at 140° C. to form the di-ester. A vacuum was then applied and the xylene was distilled off. The dioctyl aconitate which remained was then neutralized and sulphonated by adding a solution of 38 grams of sodium sulphite (Na2SO3) in 100 cc. of water and heating for 48 hours when a neutral compound was obtained. This was dried by evaporation of the water, dissolved in 100 cc. of benzene, and the solution was filtered. 200 cc. of methanol were added to the filtrate which was then cooled to 0° C. and the product was filtered off and dried. 43 grams of dioctyl disodium sulphotricarballylate were obtained as a hygroscopic yellow solid which dissolved in water to a 20% cloudy solution and which formed a cloudy gel when dispersed in an equal weight of water. Its saponification equivalent was found to be 260, theory being 262. Standard Draves wetting tests at 30° C. gave the following sinking times: at a concentration of 2 grams per liter, 21 seconds; at 1 gram per liter, 43 seconds; at 0.75 gram per liter, 55 seconds; and at 0.5 gram per liter, 105 seconds.

The process of this example is perfectly general, and may be used with any alcohol, mixture of alcohols, or by using two different alcohols successively. The sequence of process steps may therefore be illustrated as follows:

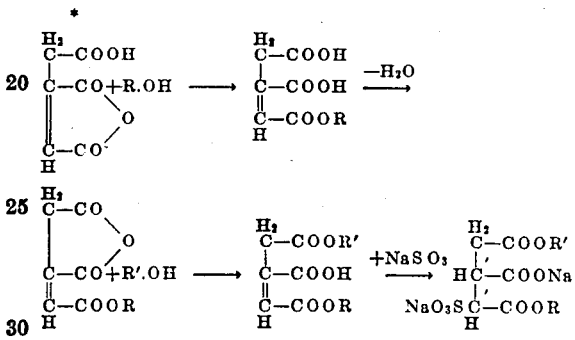

* See Beilstein, 4th ed. (1934) vol. 18, p. 511.

In the above series of reactions R.OH and R'.OH may be the same or different monohydric, dihydric or polyhydric alcohols of the aliphatic series, including either saturated or unsaturated primary or secondary alcohols, the corresponding ether alcohols, or the corresponding aromatic, hydroaromatic or heterocyclic alcohols. Typical alcohols which may be used are methyl, ethyl, propyl, isopropyl, butyl, isobutyl, amyl, isoamyl, secondary butyl carbinol, hexyl, heptyl, n-octyl, nonyl, decyl, undecyl, lauryl, myristyl, cetyl, octadecyl, oleyl or any of the other alcohols or esters containing free hydroxy groups previously mentioned in the foregoing specification and examples as being suitable for the esterification of aconitic acid. Typical aromatic alcohols are the phenyl or naphthyl-paraffin or olefin alcohols such as benzyl alcohol, phenyl methyl carbinol, the corresponding tolyl carbinols, cinnamyl alcohol, phenyl propyl (hydrocinnamyl) alcohol, phenyl isopropyl, isobutyl and isoamyl carbinols, phenyl dimethyl carbinol and the like. Hydroaromatic alcohols such as cyclohexanol and heterocyclic alcohols such as tetrahydrofurfuryl alcohol, the pyridyl alcohols such as β-pyridyl carbinol and the like may also be used.

What we claim is:

In the production of alkyl sulphotricarballylates, the steps which consist in dehydrating a compound selected from the group consisting of monoalkyl aconitate and monoalkyl sulphotricarballylate to form the corresponding anhydride and then condensing the anhydride so produced with an alcohol.

WALTER P. ERICKS.
EDMUND R. MEINCKE.